T. W. FOOTE.
INTERLOCKING CHAIR BASE.
APPLICATION FILED JUNE 20, 1918.
1,401,330.
Patented Dec. 27, 1921.
2 SHEETS—SHEET 1.
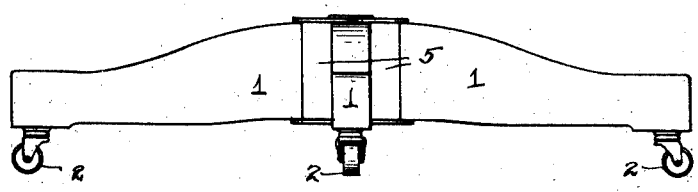
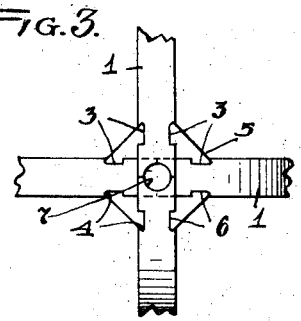
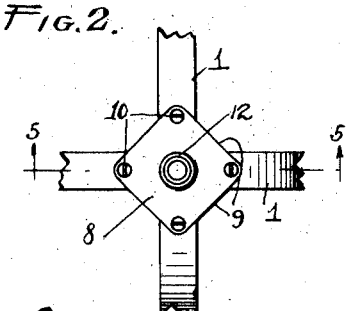
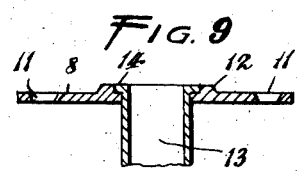
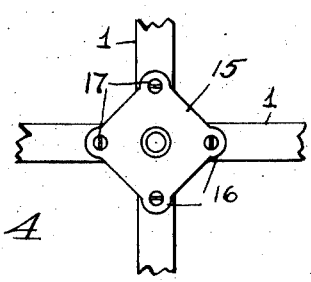
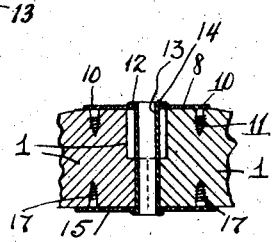
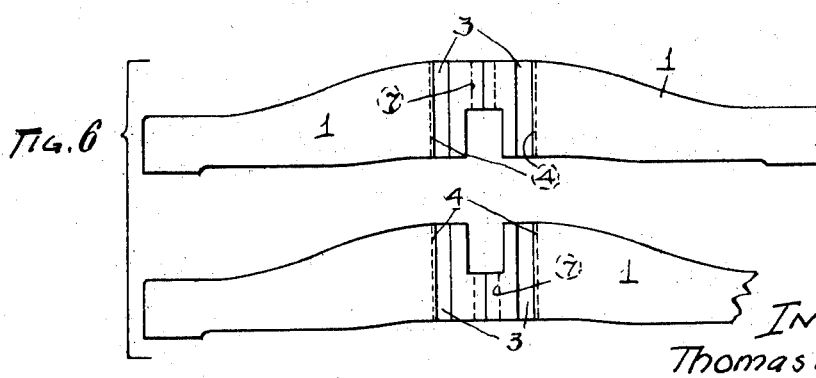
INVENTOR
Thomas W. Foote.
By Jay, Oberlin + Jay
ATTORNEYS.

T. W. FOOTE.
INTERLOCKING CHAIR BASE.
APPLICATION FILED JUNE 20, 1918.

1,401,330.

Patented Dec. 27, 1921.
2 SHEETS—SHEET 2.

INVENTOR
Thomas W. Foote.
By Fay, Oberlin + Fay
ATTORNEYS.

UNITED STATES PATENT OFFICE.

THOMAS WITHERBEE FOOTE, OF CLEVELAND, OHIO, ASSIGNOR TO THE MARBLE & SHATTUCK CHAIR COMPANY, OF BRATENAHL, OHIO, A CORPORATION OF OHIO.

INTERLOCKING CHAIR-BASE.

1,401,330.  Specification of Letters Patent.  Patented Dec. 27, 1921.

Application filed June 20, 1918. Serial No. 240,913.

*To all whom it may concern:*

Be it known that I, THOMAS W. FOOTE, a citizen of the United States, and a resident of Cleveland, county of Cuyahoga, and State of Ohio, have invented a new and useful Improvement in Interlocking Chair-Bases, of which the following is a specification, the principle of the invention being herein explained and the best mode in which I have contemplated applying that principle, so as to distinguish it from other inventions.

The present invention relates to bases for chairs or the like which are revolubly mounted on the base. It provides a suitable base having the legs securely locked together to form the central hub portion, the various parts being machine cut to facilitate the manufacture and assembly of the base. A bearing surface for the spindle of the revolving part is provided but this bearing merely acts as a reinforcement and does not carry or hold the legs as in the previous types where the hub had a heavy metal core into which the legs fitted and which gave an unsightly appearance to the base. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 7:
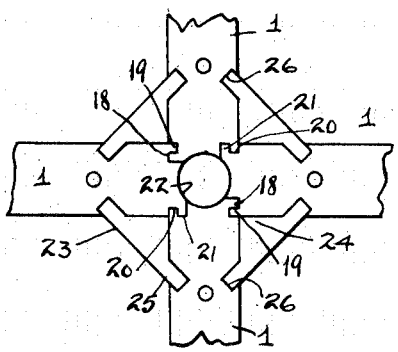
Figure 8:
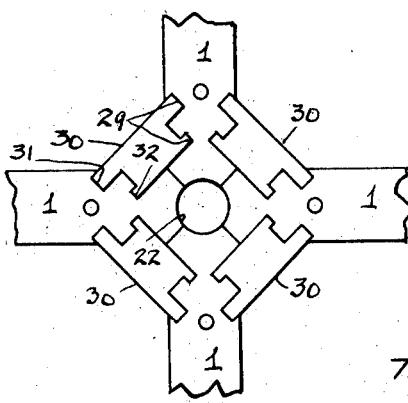

Figure 1 is a side elevation of my improved base; Fig. 2 is a top plan view with the reinforcing plate in position; Fig. 3 is a plan similar to Fig. 2, but with the plate removed; Fig. 4 is a hollow plan view; Fig. 5 is a section on the line 5—5 Fig. 2; Fig. 6 is a side elevation of the legs separated; Fig. 7 is a top plan of a modified form of central base portion; Fig. 8 is a plan similar to Fig. 7 but showing another modification and Fig. 9 is an enlarged section of the plate and sleeve.

In the former types of bases for revolving chairs and the like, it has been necessary to use a metal hub or core into which the legs were fitted and which showed when the base was completed. The present base does away with the necessity of the metal hub and provides a wood base of sturdier construction with the parts securely locked together, a metal bushing being used, but merely to take the wear of the usual spindle which holds the chair seat or other revolving part.

In the drawings a base is shown having legs 1 preferably four in number provided with the usual casters 2. The legs extend to the center of the base and in the form illustrated in Figs. 1, 3, 5 and 6 abut over one-half of their ends, each opposite pair being formed with reversely cut ends so as to make a solid central joint or hub portion. The legs have grooves 3 cut in their sides adjacent the central portion, and, as shown in Fig. 3, the grooves are undercut at their outer edges as at 4.

Locking blocks 5, having tongues 6 shaped to fit within the grooves, are provided and these blocks fit within the corners between the legs and are forced into place so that when finished an integral structure is obtained.

After being fastened together, an aperture 7 is drilled through the center or hub portion of the base and an apertured top plate 8 is placed thereon. This plate 8 will preferably be of pressed steel and will fit over the tops of the locking blocks and have its outer edges 9 alined with therewith. To hold the plate in position, screws 10 will be mounted through holes 11 so that the plate will be firmly fastened to each leg of the base. The plate 8 is of cross section as shown in Fig. 5 and is provided with a raised surface 12 which forms the bearing surface for the member carrying the chair seat (not shown). The plate has a recess 14 about the aperture and a sleeve 13 is adapted to be received within the apertures in the plate and the base member and is adapted to be peened down into the recess 14 to present an upper surface flush with the bearing surface of the plate.

A bottom plate 15 is also employed, which fits the central area and has rounded corner projections 16 extending out onto the legs to which it is fastened by means of screws 17 or the like. This plate is apertured to receive the sleeve which extends slightly below the same and is peened or riveted over the lower surface of the plate to fasten the two plates, the sleeve and the legs more firmly. The plates prevent any movement of the locking blocks and a very sturdy construction is obtained.

In Figs. 7 and 8 modified forms of interlocking bases are illustrated. In Fig. 7 the ends of the legs are cut, providing a groove 18 and a locking tongue 19 in the end of the leg and a similar groove 20 and tongue 21 in the side of the leg. When assembled, these interlock, as shown, to form the hub portion, the opening 22 for the bushing being small enough to leave the ends of the legs interlocked. The blocks 23 in this form have a triangular portion 24 with a rectangular base member 25 forming the tongues, and the grooves 26 in the sides of the legs are formed to receive the rectangular ends or tongues of the blocks to prevent movement.

In Fig. 8 the legs abut at the sides and have double grooves 29 cut therein to receive the blocks 30 provided with two extending tongues 31 and 32 which fit the grooves.

It is understood that the same form of upper and lower plates are used with all the forms of legs and locking blocks illustrated, and that the base may be made with merely the plates without employing the bushing, in which case the opening in the plates would be slightly smaller than the opening through the ends of the legs, allowing the entire wear to come on the metal plates.

In all the forms shown the central portion is a compact structure, the several legs and blocks fitting tightly together and being assembled in glue or otherwise fastened together besides being locked by the blocks and the interlocking means on the legs themselves. The usual method is to drill the hole for the bushing after assembly, the plates being then fastened on and the bushing inserted and peened to form the finished base.

The present base, with the ends of the legs abutting or interlocking, and the locking blocks secured in the grooves, makes a very sturdy, substantial structure and one that is more satisfactory than the older types, using a metal hub member. It also presents the advantage of appearing to be an entire wood base when viewed from the side instead of showing the metal hub as in the earlier types. The plates and the sleeve or bushing may be formed of pressed metal and tubing, which are cheaper than the cast hubs and less liable to break. As the grooves and blocks are all machine cut and slide readily into place, the manufacture and assembly of the base is inexpensively and easily accomplished.

Other modes of applying the principle of my invention may be employed instead of the one explained, change being made as regards the mechanism herein disclosed, providing the means stated by any of the following claims or the equivalent of such stated means be employed.

I therefore particularly point out and distinctly claim as my invention:—

1. In a chair base the combination of legs having their inner ends abutting to form a central portion, having an aperture therethrough, said legs having grooves in their sides adjacent such central portion, locking blocks having complementary formed tongues adapted to fit in such grooves in said legs, a sleeve mounted in such aperture, a top plate fastened to such central portion and adapted to cover said blocks and being apertured to receive said sleeve, and being provided with an annular recess about such aperture, a bottom plate fastened to such central portion to cover said blocks and being apertured to receive said sleeve, said sleeve being peened over within such recess to present a flush upper surface with said top plate and over such lower plate to lock said legs and blocks in position.

2. In a chair base the combination of legs having their inner ends abutting to form a central portion, having an aperture therethrough, said legs having two undercut grooves in each side and adjacent such central portion, locking blocks having complementary formed tongues adapted to fit in such groves in said legs, a sleeve mounted in such aperture, a top plate fastened to such central portion and adapted to cover said blocks and being apertured to receive said sleeve, and being provided with an annular recess about such aperture, a bottom plate fastened to such central portion to cover said blocks and being apertured to receive said sleeve, said sleeve being peened over within such recess to present a flush upper surface with said top plate and over such lower plate to lock said legs and blocks in position.

Signed by me, this 13th day of June, 1918.

THOMAS WITHERBEE FOOTE.